Jan. 16, 1968    I. N. NODFELT    3,364,455
NON-INTERCHANGEABLE CONNECTOR AND SETTING TOOL THEREFOR
Filed Oct. 6, 1965    3 Sheets-Sheet 1

Jan. 16, 1968  I. N. NODFELT  3,364,455
NON-INTERCHANGEABLE CONNECTOR AND SETTING TOOL THEREFOR
Filed Oct. 6, 1965  3 Sheets-Sheet 3

United States Patent Office 3,364,455
Patented Jan. 16, 1968

3,364,455
NON-INTERCHANGEABLE CONNECTOR AND
SETTING TOOL THEREFOR
Ingvar N. Nodfelt, Jarnvagagatan 76, Gnosj, Sweden
Filed Oct. 6, 1965, Ser. No. 493,480
Claims priority, application Sweden, Oct. 6, 1964,
11,977/64
15 Claims. (Cl. 339—90)

ABSTRACT OF THE DISCLOSURE

A connecting joint for connecting electrical cables in which the mating parts contain adjustable polarizing means for preventing interchangeability of the parts. The mating parts also contain locking means for maintaining the polarizing means in an adjusted position.

The present invention relates to improvements in non-interchangeable connecting joints which are primarily intended for connecting electric cables but which can be adapted within the scope of the invention for making connections in hydraulic or pneumatic lines. Further the joint is of a type in which the parts comprise means for preventing undesirable interchange between them.

Connecting joints designed to prevent interchange between them are already known but suffer from certain disadvantages. Thus, these known types of connecting joints are either inconvenient to handle or easily damaged. Further, the members designed to prevent interchangeability can easily be reset with the aid of common tools, such as screwdrivers, awls or the like and are, therefore, not proof against interchangeability. There are, therefore, no satisfactory guards against undesired interchange of the parts. Still further, the hitherto known types of joints are very sensitive to dirt or mechanical damage and in certain designs the members for preventing interchangeability may, therefore, become inoperative so that parts of the joint not intended to cooperate with each other may be interconnected, or alternatively interconnection of the proper parts may be prevented.

The purpose of the present invention is to eliminate all these disadvantages and further to provide a connecting joint of small external dimensions, both as regards width and length relative to its capacity.

A further purpose of the invention is to provide a great number of connecting positions in a joint of small diameter and to so design and arrange the members for preventing interchangeability so that they cannot be reset except by means of a special tool.

Figure 1:
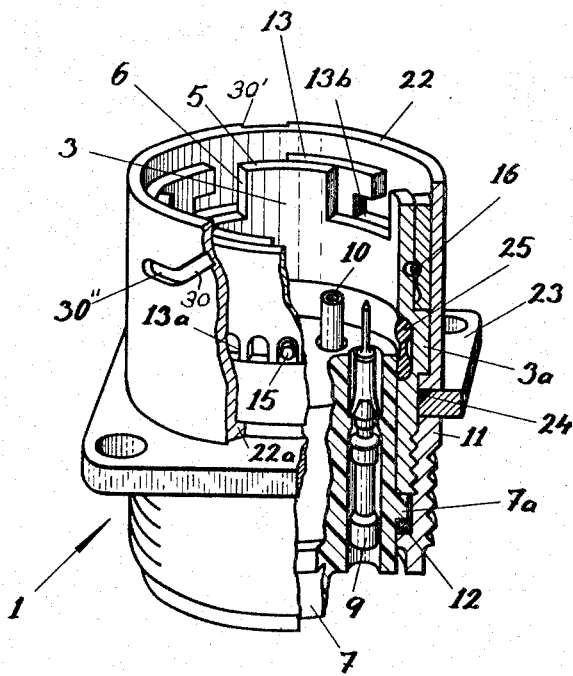
Figure 2:
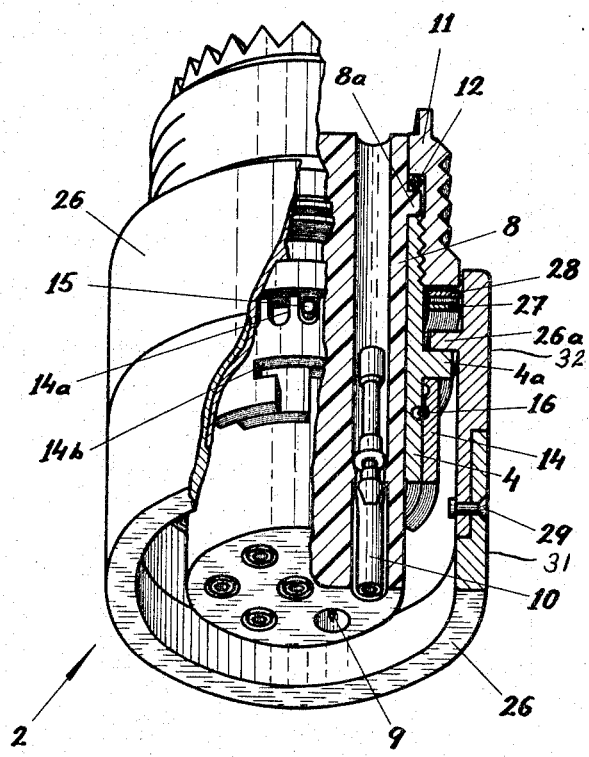
Figure 3:
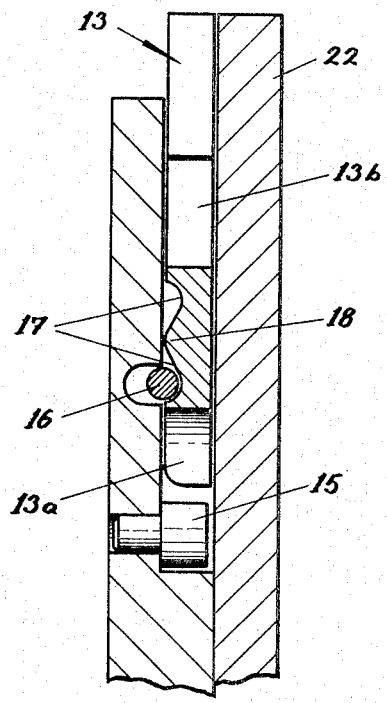
Figure 4:
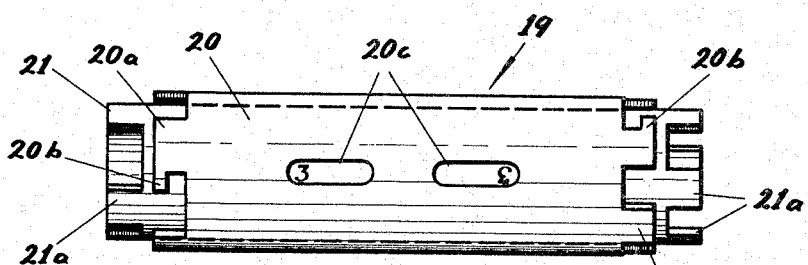

Further objects and advantages of the invention will be apparent from the following description taken in conjunction with the accompanying drawings wherein:

FIG. 1 is a view in perspective with parts broken away and in section and showing one unit of the connector;

FIG. 2 a view in perspective with parts broken away and in section and showing the other unit of the connector which mates with the unit of FIG. 1;

FIG. 3 a fragmentary sectional view to an enlarged scale showing the means for releasably retaining the sleeve in locking or in adjusting position; and FIG. 4 an elevational view showing a setting tool for use with the connector of this invention.

The joint illustrated in the drawings comprises a pair of mating connecting units 1 and 2, each having a substantially sleeve-shaped body member 3 and 4 respectively, the adjacent ends of which are provided with axially directed, preferably irregularly spaced fingers 5 separated by notches 6, the fingers of one of the body members being adapted to enter the notches of the other body member when the two body members assume certain angular positions relative each other. Each of the body members 3 and 4 of the connecting units 1 and 2 of a joint for connecting electric cables is provided with a cylindrical central core 7 and 8 respectively of dielectric material and has axially extending bores in which are located plugs and sleeve-shaped sockets forming the electrical connecting means. The core 7 of the connecting unit 1 is provided with six plugs 9 and a socket 10 while the core 8 of the connecting unit 2 is provided in a similar manner with six sockets 10 and a single plug 9. Each of the cores 7 and 8 are fixed in a certain angular position with respect to its corresponding body member 3 and 4, for example by means of a radially extending pin on each core which engages a slot in the corresponding body member so that the various plugs will fit into their corresponding sockets when the connecting units are interconnected. The pins and slots are not shown in the drawings, since this structure is entirely conventional. Each of the cores 7 and 8 is provided with an external flange 7a and 8a respectively at its rear end, i.e., that end at which the electric cable (not shown in the drawings) is connected. This flange is, as shown, held against the adjacent end of the corresponding body members 3 and 4 respectively by a retaining ring 11 having an internal flange which, when the retaining ring is mounted on its body members engages the rear side of one of the flanges 7a or 8a, either directly or through an interposed resilient ring 12. The retaining ring 11 serves to retain the respective cores 7 and 8 and is internally and externally threaded, the internal threads engaging corresponding external threads on the body members 3 and 4.

The body member 3 or 4 of each connecting unit is provided with an external flange 3a or 4a respectively, there being a sleeve 13 or 14 respectively mounted on the forward end of each of the body members, these sleeves having axially extending, irregularly spaced fingers spaced apart by notches as on the body members 3 and 4, the fingers of each sleeve being adapted to enter the corresponding notches of the other sleeve when the sleeves are in a certain angular position relative to each other. Each of the sleeves 13 and 14 is provided at the end adjacent the external flanges 3a and 4a respectively of the respective body members with evenly spaced, closely located slots 13a and 14a respectively which, as shown in the drawings, are adapted to be engaged by a radially extending locking pin 15 on the body member when the sleeves 13 and 14 are in the positions shown in FIGS. 1 and 2.

In these positions the sleeves 13 and 14 are thus fixed with their fingers and interposed notches in a definite angular position relative to the fingers and notches of the opposite body member. The sleeves 13 and 14 can, however, be shifted axially against the action of a resilient locking ring 16 located in an external peripheral groove in the respective body and engaging alternatively with one part of a corresponding peripheral double groove 17 in the respective sleeve 13 or 14. As shown in FIG. 3, the groove 17 is divided into two parts by a circular ridge 18 at the middle thereof serving to compress the locking ring 16 and cause it to snap into place in one of the parts of the groove 17 when the sleeve is shifted. When the sleeves 13 have been moved to the axial position shown in FIG. 3 the lock pin 15 is disengaged from the corresponding slot in the sleeve whereby the latter is free to rotate so that it can be set to any position corresponding to one of the said slots, after which it may be again locked in the desired position by axially shifting it towards the external flange 3a of the corresponding body member 3 so that the locking pin 15 is brought into engagement with the selected slot of the sleeve.

Peripherally directed slots 13b and 14b are provided in the fingers 5 of each sleeve 13 or 14 at preferably two diametrically opposed positions in which hook-like portions of a tool can be engaged for changing the axial and angular positions of the sleeves. A tool 19 for this purpose is illustrated in FIG. 4. This tool consists mainly of two sleeves 20 and 21 arranged telescopically one within the other, the outer sleeve 20 of which is provided at its end portions with axial fingers 20a separated by notches corresponding to the notches and fingers of the respective sleeves 13 and 14. The fingers of the outer sleeve 20 have hook-like portions 20b fitting into the slots 13b and 14b respectively of the sleeves 13 and 14 which can be brought into engagement in the said slots by introducing the fingers 20a into corresponding slots in the said sleeve and thereafter, turning the outer tool portion 20 so that the hooklike portions 20b enter the slots 13b. The sleeve 13 or 14 can then be shifted to the position shown in FIG. 3 by pulling the outer portion 20 of the tool 19 axially against the resilient action of the locking ring 16, after which the sleeve can be turned to the desired new angular position and then returned to the axial position shown in FIGS. 1 and 2 by exerting an axial force on the tool 19.

To facilitate the setting of the sleeves 13 and 14 to the desired angular positions the tool 19 may, as mentioned, be provided with an inner member 21 disposed within the outer member 20 and having both its ends provided with notches and axial fingers 21a corresponding to the fingers 5 and notches 6 of the body members 3 and 4. This inner member is further provided with a scale having indicating marks located around the circumference thereof and visible through openings 20c in the outer tool portion 20. The graduations correspond to the spacing of the slots 13a and 14a of the sleeves 13 and 14 respectively. When using the tool the fingers 21a are, as mentioned, introduced into the notches of one of the body members 3 or 4, after which the angular position of the sleeve 13 or 14 may be adjusted by turning the outer tool portion 20 until the desired indicating mark is visible through the opening 20c in the outer tool portion. The sleeve is then again shifted axially into engagement with the locking pin 15.

As is apparent from the above both units of the joint are substantially the same as regards the parts described above, but since there are considerable differences in other parts they will be described separately in the following.

The connecting unit 1 is, as shown in the drawings, provided with an outer shell 22 which entirely encircles the sleeve 13 and also to a substantial degree the body member 3. The shell 22 which, as will be described later, is also intended to form a portion of the connecting means of the joint, is provided at its rear end with an internal flange 22a which is held in abutment against the rear face of the flange 3a of the body member 3 by the retaining ring 11 through a mounting flange 23 clamped between the shell 22 and the retaining ring 11. The opening in the mounting flange 23 and that of the flange 22a of the shell 22 is non-circular and the rear end portion of the body member 3 is of corresponding non-circular section so that both the mounting flange and the shell 22 will be fixed in definite angular positions relative to the body member 3 when the retaining ring 11 is screwed home.

To prevent water from leaking into the joint a sealing ring 24 is located in an internal circular groove in the mounting flange 23 and contacts the mounting flange 23, the body 3 and the shell 22. Further, the body member 3 has a peripheral groove opposite the front end portion of the core 7 in which is located a wide sealing ring 25 which also sealingly engages the front end of the core 8 of the other connecting unit 2 when the units are interconnected.

The other connecting unit 2 is in a manner similar to unit 1 provided with an outer shell 26 which encircles the sleeve 14, as well as a substantial portion of the body member 4. The internal diameter of this shell is, however, greater than the outer diameter of the shell 22 and is so formed that when the units are connected it encircles the shell 22 of the connecting unit 1, for which purpose an annular space is provided for receiving the shell 22 between the outer shell 26 of the connecting unit 2 and the sleeve 14. The shell 26 of the other connecting unit 2 is provided at its rear end with an internal flange 26a which abuts against the rear face of the external flange 4a of the body member 4. In the face of the flange 26a remote from the flange 4a are provided one or more recesses or ridges, not shown, which are adapted to be brought into engagement with corresponding ridges or recesses, not shown, in a stop ring 27 engaging this face of the flange 26a. This ring is urged to resiliently engage the flange 26a by a resilient ring 28 interposed between the ring 27 and the retaining ring 11 whereby the ring 27 forms a detent member by means of which the shell 26 is disengageably held in required angular position relative to the body member 4.

The shell 26 of the connecting unit 2, as is apparent from FIG. 2, comprises two parts 31 and 32 rigidly united by rivets 29, the forward part 31, preferably being made of steel so as better to withstand mechanical damage. The shell 22 of the first connecting unit 1 may also similarly be made of steel. The shell 22 is provided with three equidistantly spaced external helical grooves 30, one end 30' of which extends to the front edge of the shell 22 and at the other end merges with a straight groove portion 30". The heads of the rivets 29 which project inwardly from the shell 26 of the other connecting unit 2 enter these grooves so that by turning the shell 26 relative to the unit 2 the units may be interconnected when the sleeves 13 and 14 are in proper relative positions therefor. The shell 26 is for this purpose turned from a position as determined by the stop ring 27 in which the heads of the rivets 29 enter the openings 30' of the grooves 30 at the front end of the shell 22 to another position in which they are located in the straight portions 30" of the grooves 30. Because the shell 26 is fixed in this angular position through the detent provided by the stop ring 27 the two connecting units cannot be inadvertently separated through vibration, axial forces or other mechanical forces. In order to separate them it is necessary first, to turn the shell 26 against the detent action of the ring 27.

The body members 3 and 4, which may be identical for many different connector combinations, can form the fundamental units of most of various connecting means available on the market. It is, thus, possible to provide the body members with either short or long cores which in turn may be provided with either socket or plug attachments or both socket and plug attachments as required. Further, the body members may be provided with either quadrilateral or round mounting flanges, or the flange may be omitted when the connecting unit is used for connecting cables. The body members may be provided with other types of connecting members instead of the bayonet-type locking means shown, e.g., of either threaded or push-pull type. It is also possible to use cores for different angular turning conditions relative to the body members so that thereby and in combination with the structure described above a great number of different non-interchangeable connecting joints may be provided.

It will be obvious to those skilled in the art that various changes may be made in the invention without departing from the spirit and scope thereof and therefore the invention is not limited by that which is described in the specification, but only as indicated in the appended claims.

What is claimed is:

1. A non-interchangeable connector for electric cables, said connector comprising a pair of separable mating units, each unit including a cylindrical hollow body member, said body members having mating longitudinally disposed non-uniformly spaced fingers and notches on the opposed ends thereof, a sleeve surrounding each body member, said sleeves having mating longitudinally disposed non-uniformly spaced fingers and notches on the opposed ends thereof, each sleeve being angularly adjustable to dispose the fingers and notches thereon in different angular positions, means to lock each sleeve in adjusted position, mating electrical connecting means secured in each body member, and means for releasably securing said units together with the fingers and notches on said body members inter-engaging and with the fingers and notches on said sleeves inter-engaging, the adjustment of said sleeves serving to prevent engagement of one unit having one adjustment with a mating unit having a different adjustment.

2. A connector for electric cables as defined in claim 1 in which the means to lock each sleeve in adjusted position comprises a pin projecting radially outwardly from said body member, said sleeve having a plurality of circumferentially spaced slots in the end remote from said fingers and notches, said pin being selectively received in one of said slots to lock said sleeve in adjusted position.

3. A connector for electric cables as defined in claim 2 in which said sleeve is mounted on said body member for longitudinal sliding movement, whereby longitudinal movement of said sleeve in one direction will disengage said pin from said slot to permit angular adjustment of said sleeve, longitudinal movement of said sleeve in the opposite direction serving to engage said pin in one of said slots to lock said sleeve in adjusted position.

4. A connector for electric cables as defined in claim 3 in which means is provided for releasably retaining said sleeve in locked or unlocked position.

5. A connector for electric cables as defined in claim 4 in which said body member has an outwardly opening groove in the outer surface, said sleeve having an inwardly opening relatively wide groove in the inner surface, a raised portion intermediate the width of said last named groove and inclined cam surfaces extending from said raised portion toward the opposite sides of said last named groove, said means for releasably retaining said sleeve in locked or unlocked position comprising a snap ring biased outwardly and disposed partially in the groove in said body member and partially in the groove in said sleeve, said ring being cammed inwardly by said cam surfaces and said raised portions as said sleeve is moved between locked and unlocked position.

6. A connector for electric cables as defined in claim 1 in which at least two diametrically opposed fingers on said sleeve are provided with recesses communicating with the adjacent notches in said sleeve, said adjacent notches and recesses serving to receive complementary elements of an adjusting tool to facilitate locking, unlocking and adjustment of said sleeve.

7. A connector for electric cables as defined in claim 1 in which said mating electrical connecting means comprises a core of dielectric material disposed in each unit, means for securing each core in the body member of each unit, and mating plugs and sockets in said cores.

8. A connector for electric cables as defined in claim 7 in which the means for securing each core in each body member comprises an external flange on said core, and a retaining ring threadedly received on said body member for clamping said flange in engagement with the rear end of said body member.

9. A connector for electric cables as defined in claim 7 in which the core of one unit is of greater length than the core of the other unit, said longer core extending outwardly beyond the adjacent fingers of said body member and said sleeve.

10. A connector for electric cables as defined in claim 9 in which the body member of the unit having the shorter core is provided with an internal annular groove adjacent the end of the core, and a sealing ring disposed in said annular groove for engaging the ends of the cores of both units to provide a seal therebetween.

11. A connector for electric cables as defined in claim 1 in which each unit is provided with a shell surrounding said sleeve and at least a portion of said body member, said shell being of a diameter to be telescopically received one within the other, and inter-engaging means on said shells for releasably securing said units together in mating relationship.

12. A connector for electric cables as defined in claim 11 in which the means for releasably securing said units together comprises a bayonet joint, the outer shell being rotatably mounted on the associated body member and the inner shell being fixed against rotation.

13. A connector for electric cables as defined in claim 12 in which said outer shell is provided with an internal annular flange, an external annular flange on the associated body member, a retaining ring threadedly received on said body member for retaining said flanges in engagement, and detent means provided between said retaining ring and said internal flange for releasably retaining said outer shell in a desired angular position with respect to said body member.

14. A connector for electric cables as defined in claim 13 in which said detent means comprises a snap ring disposed between said retaining ring and said internal flange, and angularly spaced inter-engaging means on said snap ring and said internal flange.

15. A non-interchangeable connector for electric cables, said connector comprising a pair of separable mating units, each unit including a cylindrical hollow body member, said body members having mating longitudinally disposed fingers and notches on the opposed ends thereof, a sleeve surrounding each body member, said sleeves having mating longitudinally disposed spaced fingers and notches on the opposed ends thereof, each sleeve being angularly adjustable to dispose the fingers and notches thereon in different angular positions, means to lock each sleeve in adjusted position, mating electrical connecting means secured in each body member, and means for releasably securing said units together with the fingers and notches on said body members interengaging and with the fingers and notches on said sleeves inter-engaging, the adjustment of said sleeves serving to prevent engagement of one unit having one adjustment with a mating unit having a different adjustment.

References Cited
UNITED STATES PATENTS 2,961,630  11/1960  Duncan _____ 339—90
3,146,054  8/1964  Shearer et al. _____ 339—186

MARVIN A. CHAMPION, *Primary Examiner.*

J. H. McGLYNN, *Assistant Examiner.*